(12) United States Patent
Jiang et al.

(10) Patent No.: US 8,543,992 B2
(45) Date of Patent: Sep. 24, 2013

(54) METHOD AND APPARATUS FOR PARTITIONING PROGRAMS TO BALANCE MEMORY LATENCY

(75) Inventors: Xiaodan Jiang, Shanghai (CN);
Jinquan Dai, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1495 days.

(21) Appl. No.: 10/585,680

(22) PCT Filed: Dec. 17, 2005

(86) PCT No.: PCT/CN2005/002232
§ 371 (c)(1),
(2), (4) Date: Jul. 10, 2006

(87) PCT Pub. No.: WO2007/068148
PCT Pub. Date: Jun. 21, 2007

(65) Prior Publication Data
US 2009/0193405 A1    Jul. 30, 2009

(51) Int. Cl.
*G06F 9/45* (2006.01)

(52) U.S. Cl.
USPC ........... 717/149; 717/151; 717/161; 718/102; 718/105

(58) Field of Classification Search
None
See application file for complete search history.

(56) References Cited

U.S. PATENT DOCUMENTS

| | | | | |
|---|---|---|---|---|
| 5,179,699 A * | 1/1993 | Iyer et al. | | 1/1 |
| 5,524,264 A | 6/1996 | Shirota et al. | | |
| 5,642,512 A | 6/1997 | Tanaka et al. | | |
| 5,768,594 A * | 6/1998 | Blelloch et al. | | 717/149 |
| 5,872,972 A * | 2/1999 | Boland et al. | | 718/102 |
| 6,374,403 B1 * | 4/2002 | Darte et al. | | 717/161 |
| 6,587,866 B1 * | 7/2003 | Modi et al. | | 718/105 |
| 6,601,084 B1 * | 7/2003 | Bhaskaran et al. | | 718/105 |
| 6,681,388 B1 * | 1/2004 | Sato et al. | | 717/159 |
| 6,691,306 B1 * | 2/2004 | Cohen et al. | | 717/139 |
| 6,728,748 B1 * | 4/2004 | Mangipudi et al. | | 718/105 |
| 6,952,816 B2 * | 10/2005 | Gupta et al. | | 716/18 |
| 6,970,929 B2 * | 11/2005 | Bae et al. | | 709/226 |
| 7,103,879 B2 * | 9/2006 | Ruellan et al. | | 717/130 |
| 7,162,579 B2 * | 1/2007 | Horn et al. | | 711/114 |
| 7,363,467 B2 * | 4/2008 | Vajapeyam et al. | | 712/216 |
| 7,406,692 B2 * | 7/2008 | Halpern et al. | | 718/105 |
| 7,908,355 B2 * | 3/2011 | Chauffour et al. | | 709/224 |
| 8,176,479 B2 * | 5/2012 | Morrow et al. | | 717/155 |

(Continued)

FOREIGN PATENT DOCUMENTS

| EP | 0363882 A2 | 4/1990 |
|---|---|---|
| JP | 04-070439 | 3/1992 |

OTHER PUBLICATIONS

S. Ho, S. Han, H. Kim "Partitioning a lenient parallel language into sequential threads", 1995, Proceedings of the Twent-Eight Hawaii International Conference on System Sciences, vol. 2, pp. 83-92.*
Au, E.K.S; Wai Ho Mow A modified state reduction algorithm for computing Weight Enumerators for Convolution Codes, 2005, ISIT 2005 Proceedings, International Symposium.*
Meng Wang, Chungui Li and Xiaorong Wang, "Chinese Automatic Summarization Based on Thematic Sentence Discovery", 2007, Fuzzy Systems and Knowledge discovery.*
Liyang Lai Patel, J.H. Rinderknecht and T. Wu-Teng Cheng "Hardware Efficient LBIST with Complementary Weights", 2005, VLSI in Computers and Processors.*
Krishnamurthy, "A Brief Survey of Papers on Scheduling for Pipelined Processors", 1990, SIGPLAN Notices, V25 #7, pp. 97-106.*

*Primary Examiner* — Jason Mitchell
(74) *Attorney, Agent, or Firm* — L. Cho (57) ABSTRACT

A method of compiling code that includes partitioning instructions in the code among a plurality of processors based on memory access latency associated with the instructions is disclosed. According to one aspect of the invention, partitioning instructions includes partitioning memory access dependence chains. Other embodiments are described and claimed.

15 Claims, 11 Drawing Sheets

(56) References Cited

U.S. PATENT DOCUMENTS

| | | | |
|---|---|---|---|
| 2002/0124240 A1* | 9/2002 | Ruellan et al. | 717/140 |
| 2003/0037319 A1* | 2/2003 | Narang | 717/144 |
| 2003/0126408 A1* | 7/2003 | Vajapeyam et al. | 712/214 |
| 2004/0158694 A1* | 8/2004 | Tomazin et al. | 712/225 |
| 2005/0149940 A1* | 7/2005 | Calinescu et al. | 718/104 |
| 2006/0026599 A1* | 2/2006 | Herington et al. | 718/105 |
| 2006/0037024 A1* | 2/2006 | Bodas | 718/105 |
| 2006/0112377 A1* | 5/2006 | Nacul et al. | 717/140 |
| 2009/0089765 A1* | 4/2009 | Guo et al. | 717/144 |
| 2011/0067017 A1* | 3/2011 | Ghosh-Roy et al. | 717/155 |

* cited by examiner

METHOD AND APPARATUS FOR PARTITIONING PROGRAMS TO BALANCE MEMORY LATENCY

FIELD

An embodiment of the present invention relates to compilers. More specifically, an embodiment of the present invention relates to a method and apparatus for partitioning programs to balance memory latency.

BACKGROUND

Processor designs are moving towards multiple core architectures where more than one core (processor) is implemented on a single chip. Multiple core architectures provide increased computing power while requiring less space and a lower amount of power. Multiple core architectures are particularly useful for pipelining instructions in applications that require high processing speeds, such as packet processing in networks which may require processing speeds of up to 10 Gigabits per second. The instructions may be pipelined, for example, into stages where each stage is supported by a different processor or processor core.

The performance of pipelined computations as a whole can be no faster than the slowest of the pipeline stages. For this reason, when pipelining instructions, compilers attempt to balance instructions among stages as evenly as possible. It is common for compilers to partition instructions between stages based upon the compute cycles required for executing instructions. This technique may be effective in some instances. However, when the instructions include a large number of memory accesses, the latency required for completing some memory accesses may produce additional undesired delay that is not accounted for by the compilers. For example, while the latency of two independent memory accesses may be overlapped with each other, instructions that depend on the completion of a particular memory access operation cannot be executed until the memory access is completed. Hence, instructions with dependencies on memory access operations cannot be overlapped with the latency of the memory access.

Thus, what is needed is a method and apparatus for partitioning programming to balance memory latency.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. However, it will be apparent to one skilled in the art that specific details in the description may not be required to practice the embodiments of the present invention. In other instances, well-known components, programs, and procedures are shown in block diagram form to avoid obscuring embodiments of the present invention unnecessarily.

Figure 1:
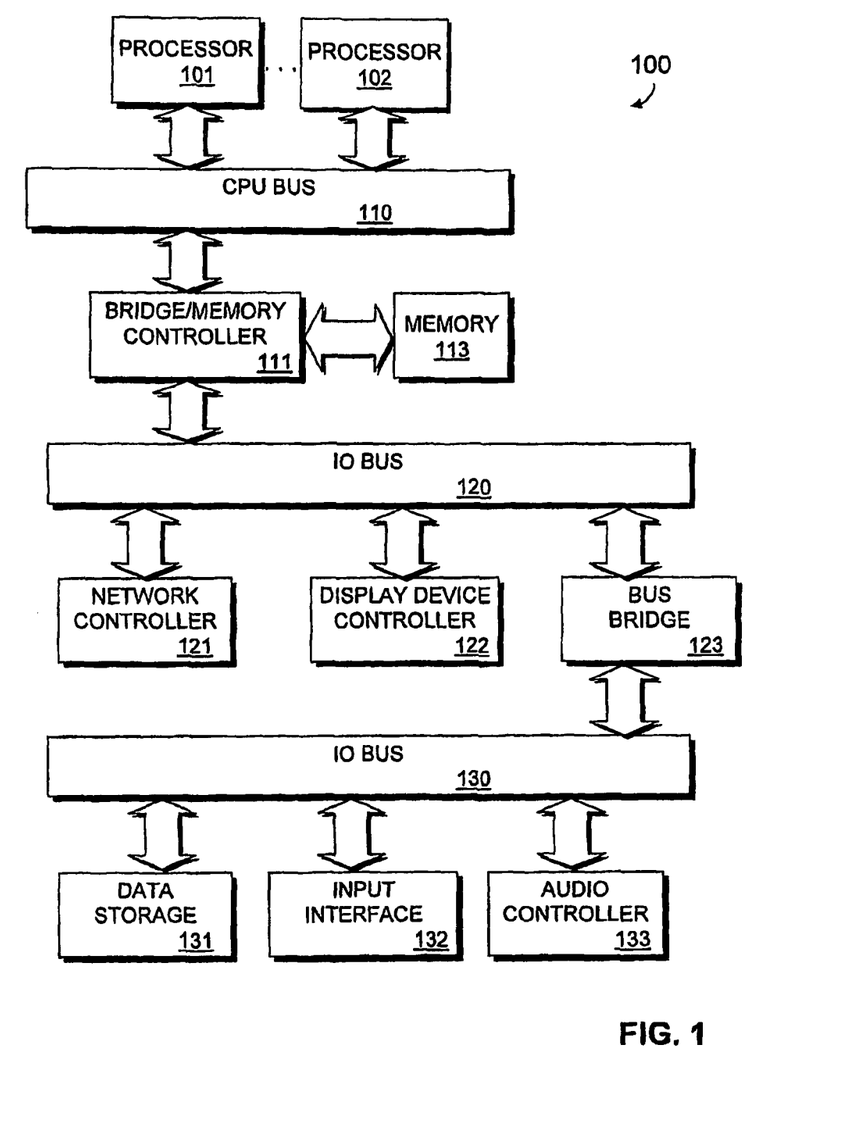
FIG. 1 is a block diagram of an exemplary computer system in which an example embodiment of the present invention may be implemented.

FIG. 1 is a block diagram of an exemplary computer system 100 according to an embodiment of the present invention. The computer system 100 includes a plurality of processors and a memory 113. Block 101 represents a first processor 101 and block 102 represents a jth processor, where j may be any number. The processors 101 and 102 process data signals. The processors 101 and 102 may be complex instruction set computer microprocessors, reduced instruction set computing microprocessors, very long instruction word microprocessors, processors implementing a combination of instruction sets, or other processor devices. Each processor may include one or more processor cores that may support one or more hardware threads. The computer system 100 is illustrated with processors represented as separate blocks. It should be appreciated, however, that the processors may reside on a single chip and may be represented as a single block. The processors 101 and 102 are coupled to a CPU bus 110 that transmits data signals between processor 101 and other components in the computer system 100.

The memory 113 may be a dynamic random access memory device, a static random access memory device, read-only memory, and/or other memory device. The memory 113 may store instructions and code represented by data signals that may be executed by the processor 101. According to an example embodiment of the computer system 100, a compiler may reside in a different computer system and generate destination instruction codes which are downloaded and executed on the computer system 100. Alternatively the compiler may be stored in the memory 113 and implemented by the processors 101 and 102 in the computer system 100. The compiler may partition programs to balance memory latency. According to one embodiment, the compiler partitions instructions in the code of a program among the processors 101 and 102 based on memory access latency associated with the instructions.

A cache memory may reside inside each of the processors 101 and 102 to store data signals stored in memory 113. The cache speeds access to memory by the processor 101 by taking advantage of its locality of access. In an alternate embodiment of the computer system 100, the cache resides external to the processor 101. A bridge/memory controller 111 is coupled to the CPU bus 110 and the memory 113. The bridge/memory controller 111 directs data signals between the processor 101, the memory 113, and other components in the computer system 100 and bridges the data signals between the CPU bus 110, the memory 113, and a first input output (IO) bus 120.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage 131 is coupled to the second IO bus 130. The data storage 131 may be a hard disk drive, a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second IO bus 130. The audio controller 133 operates to coordinate the recording and playing of sounds and is also coupled to the IO bus 130. A bus bridge 123 couples the first IO bus 120 to the second IO bus 130. The bus bridge 123 operates to buffer and bridge data signals between the first IO bus 120 and the second IO bus 130.

Figure 2:
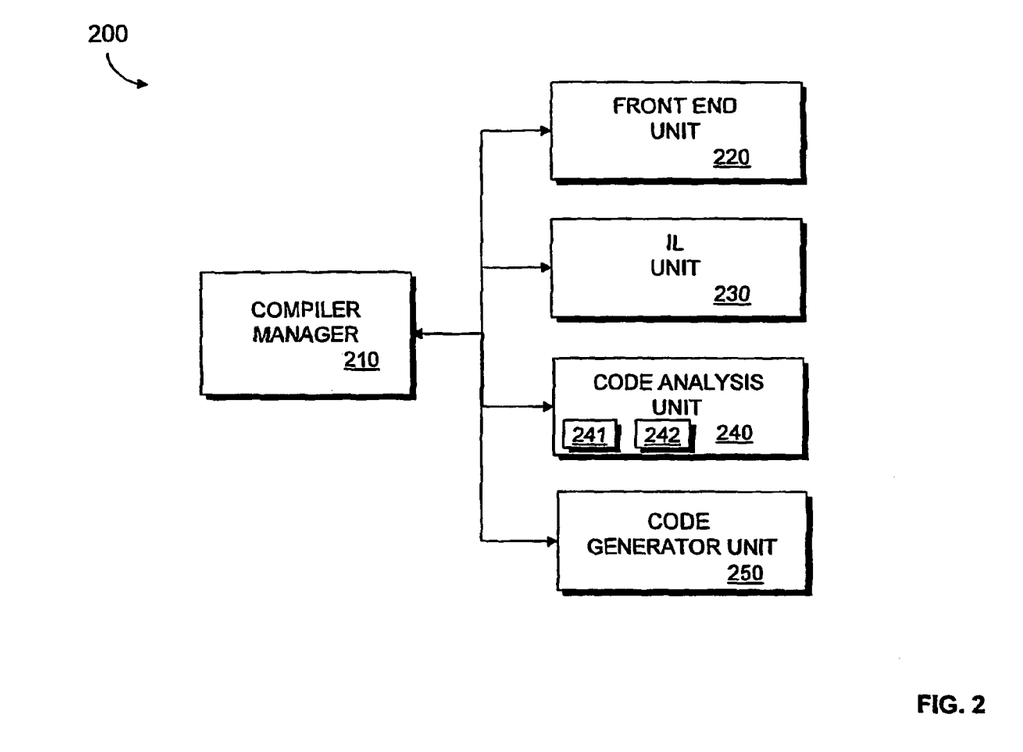
FIG. 2 is a block diagram that illustrates a compiler according to an example embodiment of the present invention.

FIG. 2 is a block diagram that illustrates a compiler 200 according to an example embodiment of the present invention. The compiler 200 includes a compiler manager 210. The compiler manager 210 receives source code to compile. The compiler manager 210 interfaces with and transmits information between other components in the compiler 200.

The compiler 200 includes a front end unit 220. According to an embodiment of the compiler 200, the front end unit 220 operates to parse source code and convert it to an abstract syntax tree.

The compiler 200 includes an intermediate language (IL) unit 230. The intermediate language unit 230 transforms the abstract syntax tree into a common intermediate form such as an intermediate representation. It should be appreciated that the intermediate language unit 230 may transform the abstract syntax tree into one or more common intermediate forms.

The compiler 200 includes a code analysis unit 240. The code analysis unit 240 includes a dependence information unit 241. According to an embodiment of the code analysis unit 240, the dependence information unit 241 identifies instruction dependence information such as flow dependence and control dependence between instructions in the code. The dependence information unit 241 may generate a memory access dependence graph and memory access dependence chains from the instruction dependence information. The code analysis unit 240 includes a code partitioning unit 242 that partitions instructions in the code among a plurality of processors based on memory access latency associated with the instructions.

The compiler 200 includes a code generator unit 250. The code generator unit 250 converts the intermediate representation into machine or assembly code.

Figure 3:
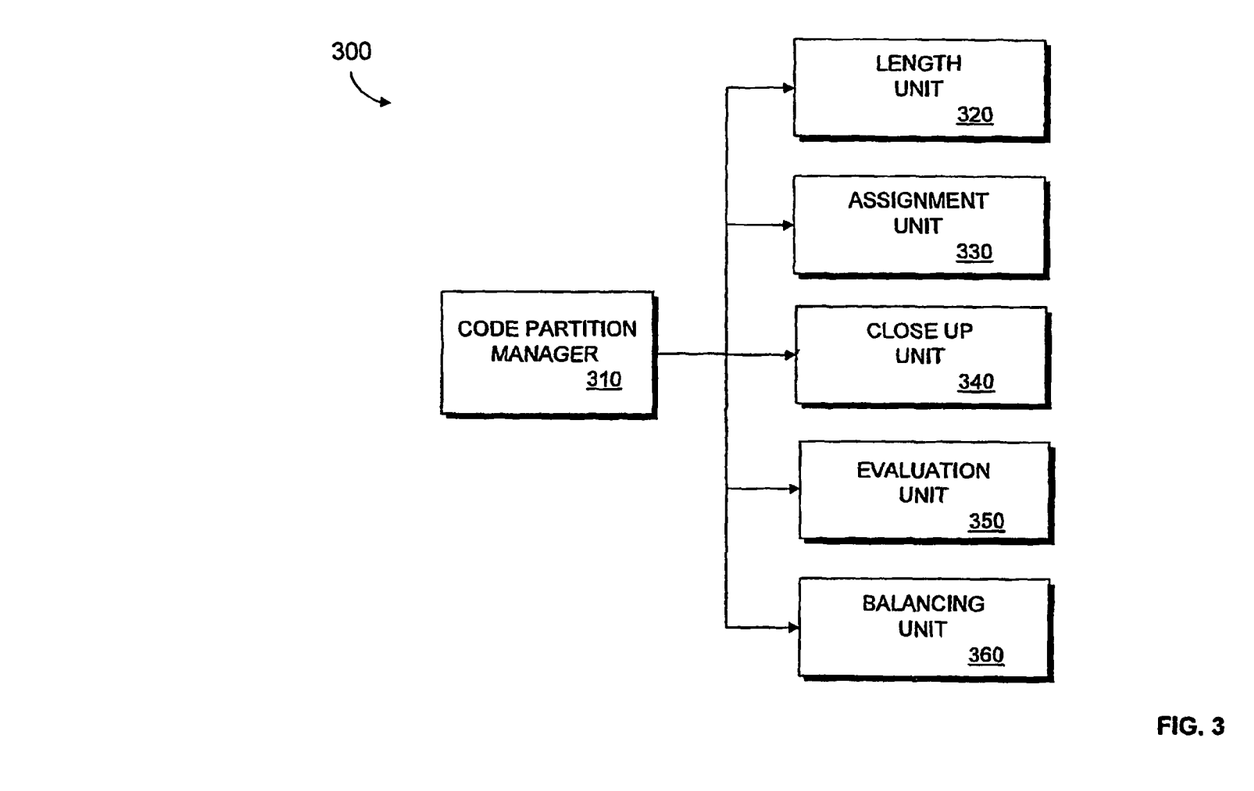
FIG. 3 is a block diagram of a code partitioning unit according to an example embodiment of the present invention.

FIG. 3 is a block diagram of a code partitioning unit 300 according to an example embodiment of the present invention. The code partitioning unit 300 may be used to implement the code partitioning unit 242 illustrated in FIG. 2. The code partitioning unit 300 partitions instructions in code to one or more pipeline stages. Each pipeline stage may be executed by a separate processor. The code partitioning unit 300 includes a code partition manager 310. The code partition manager 310 receives code instruction dependence information and memory access dependence chains. The code partition manager 310 interfaces with and transmits information between other components in the code partitioning unit 300.

The code partitioning unit 300 includes a length unit 320. The length unit determines a number of nodes from a memory access dependence chain to allocate to an upstream stage and a downstream stage. The nodes from the memory access dependence chain represent memory access instructions. The upstream stage may be designated as a pipeline stage. The downstream stage may be designated as one or more pipeline stages after the upstream stage. According to an embodiment of the present invention, the number desired upstream nodes to allocate to the upstream stage is N/d and the number of desired downstream nodes to allocate to the downstream stage is $N*(d-1)/d$, where N is the length of the memory access dependence chain, and d is the pipelining degree. It should be appreciated that this relationship may be adjusted according to the actual compute environment.

The code partitioning unit 300 includes an assignment unit 330. The assignment unit 330 assigns a first number of desired upstream nodes in a memory access dependence chain to the upstream stage. The assignment unit 330 may also assign a last number of desired downstream nodes in a memory access dependence chain to the downstream stage.

The code partitioning unit 300 includes a close up unit 340. The close up unit 340 assigns instructions in the code which may include memory access or non-memory access instructions for which the first number of desired upstream nodes is dependent on to the upstream stage. After the memory access dependence chain has been processed for downstream stage assignment, the close up unit 340 may also assign instructions in the code which may include memory access or non-memory access instructions for which depends on the last number of desired downstream nodes to the downstream stage. The close up unit 340 assigns an instruction only once. Only remaining unassigned instructions are available for assignment to other stages.

The code partitioning unit 300 includes an evaluation unit 350. The evaluation unit 350 determines whether a computed weight for executing the instructions assigned to the upstage stream or the downstream stage exceeds a predetermined value. If the computed weight required for executing the instructions in the upstream stage or the downstream stage exceeds a predetermined value, a new number of desired upstream nodes or a new number of desired downstream nodes is determined. According to an embodiment of the code partitioning unit 300, the new number may include one less number of desired upstream nodes or number of desired downstream nodes.

The code partitioning unit 300 includes a balancing unit 360. According to an embodiment of the present invention, the components of the code partitioning unit 300 process each memory access dependence chain to assign instructions to either an upstream stage or a downstream stage. After all the memory access dependence chains have been processed, the balancing unit 360 assigns the remaining unassigned instructions in the code to either the upstream stage or downstream stage. The code partitioning unit 300 partitions instructions to two stages at a time. The instructions assigned to an upstream stage represent instructions that may be assigned to a single pipelined stage. The instructions assigned to the downstream stage may require further partitioning by the code partitioning unit 300 in order to identify instructions for additional pipelined stages if the pipelining degree (number of pipelined stages) is greater than 2.

Figure 4:
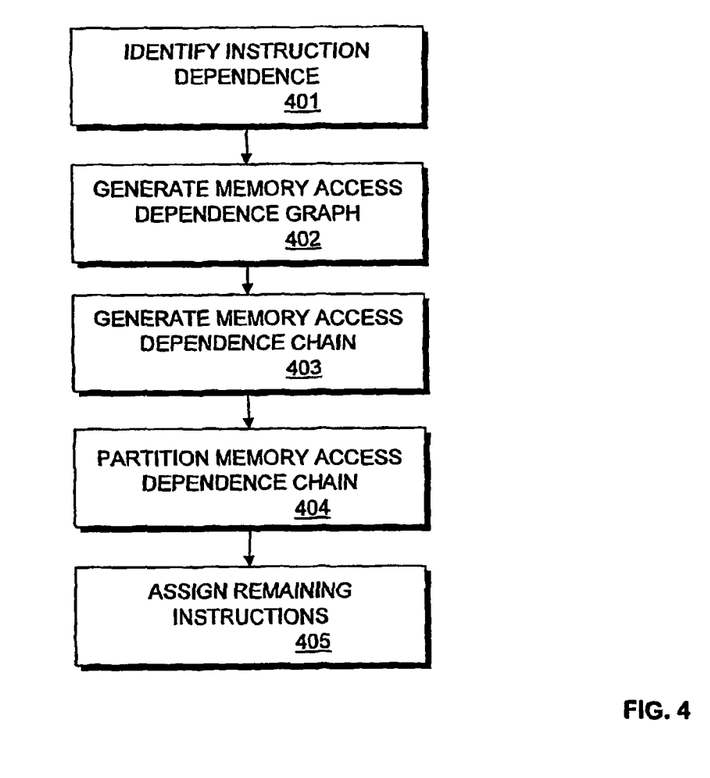
FIG. 4 is a flow chart illustrating a method for partitioning memory access latency according to an example embodiment of the present invention.

FIG. 4 is a flow chart illustrating a method for partitioning memory access latency according to an example embodiment of the present invention. Some of the techniques in the flow chart may be performed by a compiler such as the compiler shown in FIG. 3. At 401, instruction independence information for instructions in code is identified. The instruction independence information may include the flow dependence information and control dependence information of every instruction in the program.

At 402, a memory access dependence graph is generated. The memory access dependence graph may be generated from the instruction independence information determined at 401.

At 403, memory access dependence chains are generated from the memory access dependence graph generated at 402. According to an embodiment of the present invention, a memory access dependence chain is a path $(n_1, n_2, \ldots n_k)$ in the memory access dependence graph where $n_1$ has no predecessors and $n_k$ has no successor, and can be computed by traversing the memory access dependence graph.

At 404, the memory access dependence chains are partitioned. The memory access dependence chains are partitioned using a set of procedures where the instructions in the code are partitioned into two stages each time the set of procedures is performed. For d-way pipelining transformation, where d is the pipelining degree, the set of procedures is performed d−1 times. The set of procedures partitions the instructions in the code to an upstream stage and a downstream stage. The set of procedures may be subsequently performed on the instructions assigned to the downstream stage when necessary. According to an embodiment of the present invention, the memory access dependence chains are partitioned in a decreasing order of length.

At 405, the remaining instructions are assigned. According to an embodiment of the present invention, the remaining instructions may be assigned while trying to balance a computed weight among the pipelined stages, or using other techniques.

Figure 5:
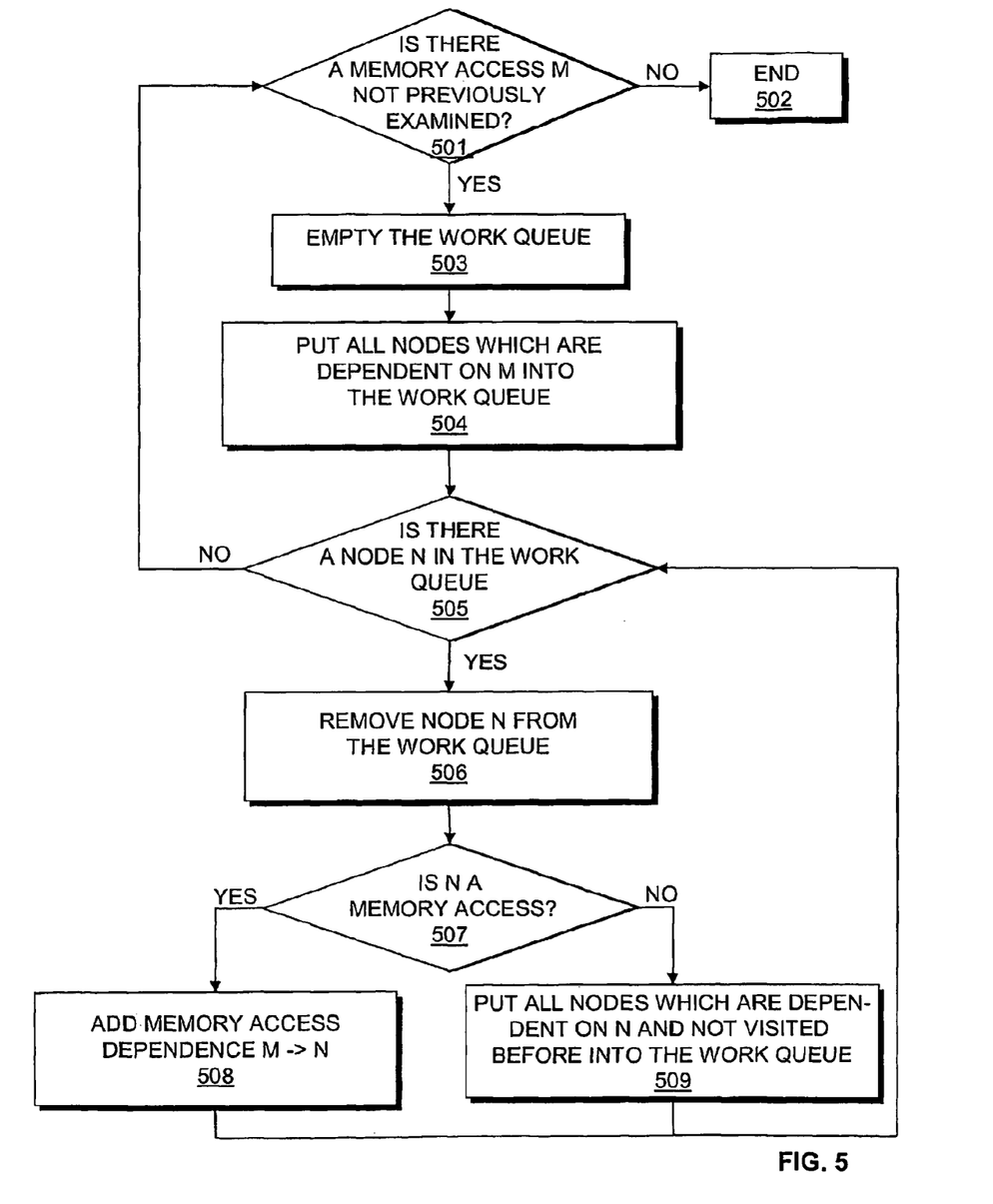
FIG. 5 is a flow chart illustrating a method for generating a memory access dependence graph according to an example embodiment of the present invention.

FIG. 5 is a flow chart illustrating a method for generating a memory access dependence graph according to an example embodiment of the present invention. This procedure may be implemented by 402 shown in FIG. 4. At 501, it is determined whether there is a memory access instruction, M, not previously examined. If no memory access instruction, M, that has not been previously examined exists, control proceeds to 502. If a memory access instruction, M, that has not previously been examined exists, control proceeds to 503.

At 502, control terminates the procedure.

At 503, a work queue is emptied.

At 504, all instructions that are dependent on memory access instruction M are represented as nodes and are placed in the work queue.

At 505, it is determined whether there is a node, N, in the work queue. If there is not a node in the work queue, control returns to 501. If there is a node in the work queue, control proceeds to 506.

At 506, node N is removed from the work queue.

At 507, it is determined whether node N is a memory access instruction. If it is determined that node N is a memory access instruction, control proceeds to 508. If it is determined that node N is not a memory access instruction, control proceeds to 509.

At 508, memory access dependence M is connected to N in the memory access dependence graph.

At 509, all instructions that are dependent on the instruction represented by node N and have not been visited before are placed into the work queue. Control returns to 505.

Figure 6:
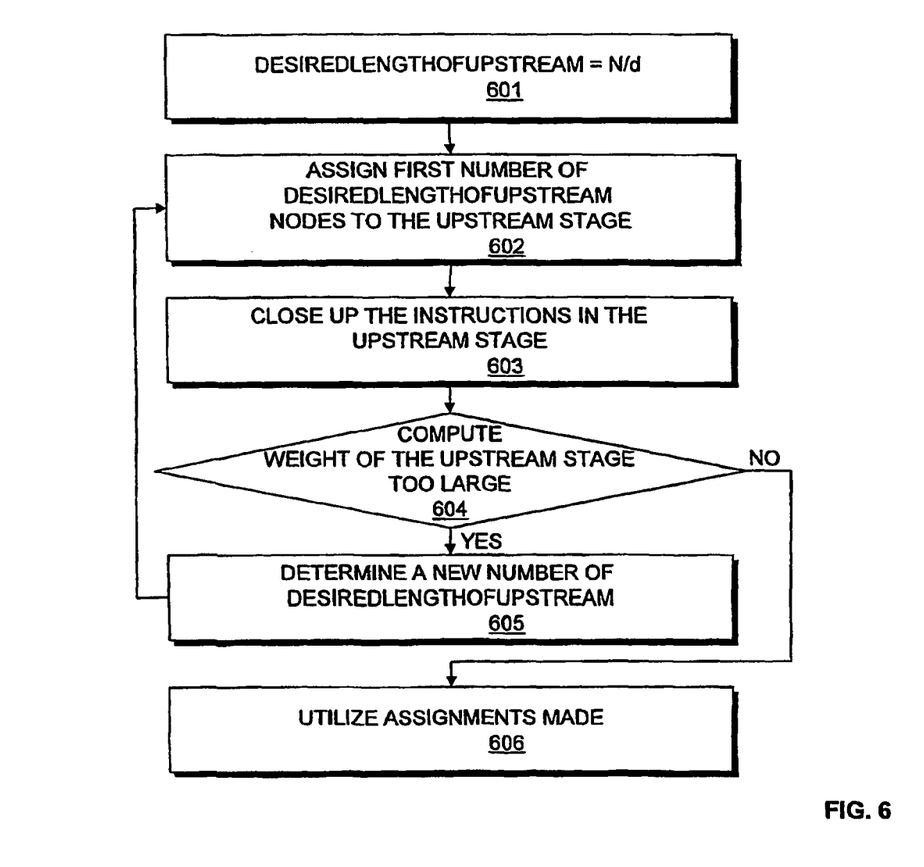
FIG. 6 is a flow chart illustrating a method for partitioning a memory access dependence chain into an upstream stage according to an example embodiment of the present invention.
Figure 7:
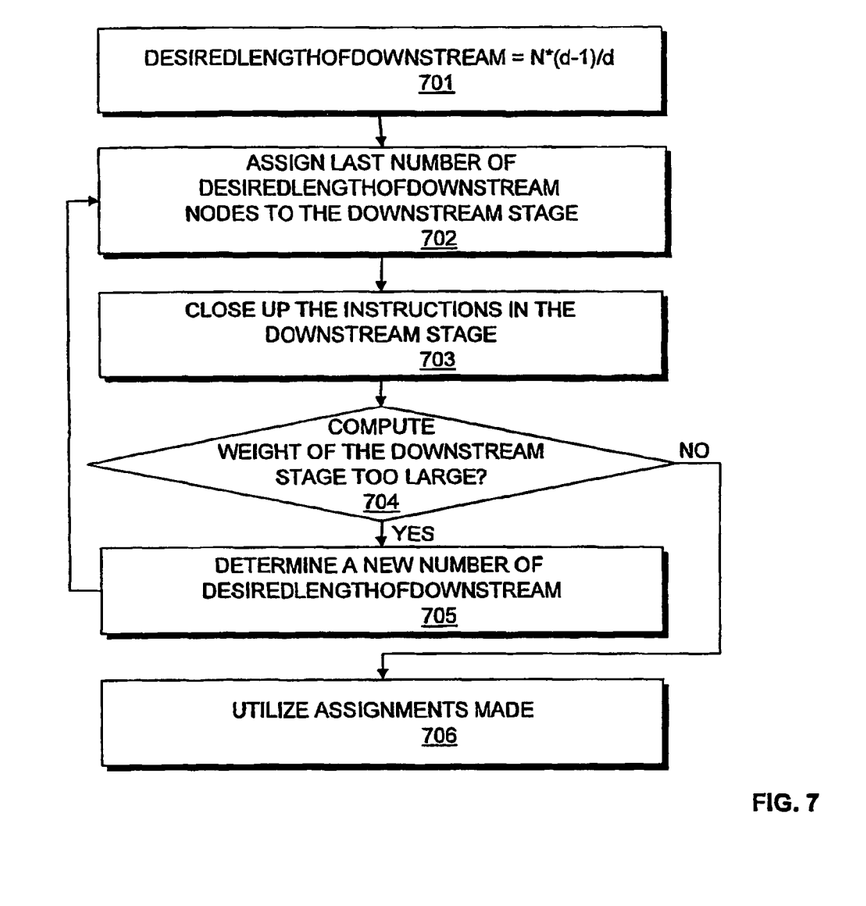
FIG. 7 is a flow chart illustrating a method for partitioning a memory access dependence chain into a downstream stage according to an example embodiment of the present invention.

FIG. 6 is a flow chart illustrating a method for partitioning a memory access dependence chain into an upstream stage according to an example embodiment of the present invention. FIG. 7 is a flow chart illustrating a method for partitioning a memory access dependence chain into a downstream stage according to an example embodiment of the present invention. The techniques in FIGS. 6 and 7 may be applied together to each memory access dependence chain identified in code. Together, the technique illustrated in FIGS. 6 and 7 may be used to implement 404 shown in FIG. 4. At 601, a number of nodes from a memory access dependence chain to allocate to an upstream stage (DesiredLengthofUpstream) are determined. According to an embodiment of the present invention, the number of desired upstream nodes to allocate to the upstream stage is N/d.

At 602, a first number of desired upstream nodes in a memory access dependence chain are assigned to the upstream stage.

At 603, the instructions in the upstream stage are closed up. According to an embodiment of the present invention, closing up includes assigning instructions in the code, which may include non-memory access instructions, for which the first number of desired upstream nodes are dependent on to the upstream stage.

At 604, it is determined whether a computed weight for executing the instructions assigned to the upstage stream exceeds a predetermined value. If the computed weight required for executing the instructions in the upstream stage exceeds a predetermined value, control proceeds to 605. If the computed weight required for executing the instructions in the upstream stage does not exceed the predetermined value, control proceeds to 606.

At 605, a new number of desired upstream nodes to allocate to the upstream stage is determined. According to an embodiment of the present invention, the new number may be the previous number subtracted by one.

At 606, the assignments made to the upstream stage are utilized.

Referring to FIG. 7, at 701, a number of nodes from a memory access dependence chain to allocate to a downstream stage (DesiredLengthofDownstream) is determined. According to an embodiment of the present invention, the number of desired downstream nodes to allocate to the downstream stage is $N*(d-1)/d$.

At 702, a last number of desired downstream nodes in a memory access dependence chain are assigned to the downstream stage.

At 703, the instructions in the downstream stage are closed up. According to an embodiment of the present invention, closing up may include assigning instructions in the code, which may include memory and non-memory access instructions, which depend on the last number of desired downstream nodes to the downstream stage.

At 704, it is determined whether a computed weight for executing the instructions assigned to the downstage stream exceeds a predetermined value. If the computed weight required for executing the instructions in the downstream stage exceeds a predetermined value, control proceeds to 705. If the computed weight required for executing the instructions in the downstream stage does not exceed the predetermined value, control proceeds to 706.

At 705, a new number of desired downstream nodes to allocate to the downstream stage is determined. According to an embodiment of the present invention, the new number may be the previous number subtracted by one.

At 706, the assignments made to the downstream stage are utilized.

FIGS. 4-7 are flow charts illustrating methods according to embodiments of the present invention. The techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

According to an embodiment of the present invention, memory access instructions are allocated among program partitions in the pipelining transformation of applications. The memory access latency in each pipeline stage is effectively hidden by overlapping the latency of memory accesses and other operations. This is achieved by summarizing the dependence between the memory access instructions in the program, constructing dependence chains of the memory access instructions, and partitioning the memory access dependence chains evenly among the pipeline stages.

A group of exemplary instructions which may be partitioned across two pipelined stages according to an embodiment of the present invention is shown below.

---

(1) t1 = f( );
(2) t2 = read(t1)
(3) t3 = read (t1 + 1)
(4) g(t3)
(5) t4 = t2 +c1
(6) t5 = read (t4)
(7) h(t5)
(8) if (t3>0)
    {
(9) k(t5)
(10) t6 = read (t5)
(11) t7 = t4 +1
(12) write (t7, t6)
    }

---

Figure 8:
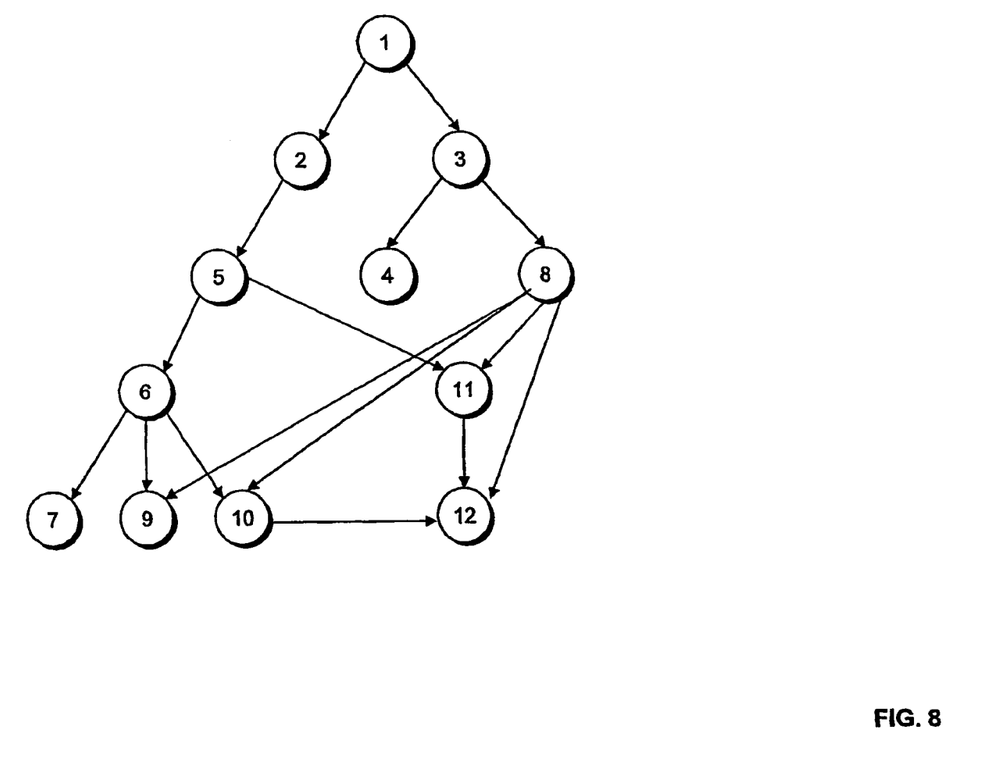
FIG. 8 illustrates an exemplary dependence graph according to an example embodiment of the present invention.

Referring to FIG. 4, at 401, instruction independence information for instructions in code is identified. The instruction independence information may include the flow dependence information and control dependence information of every instruction in the program. FIG. 8 illustrates an exemplary dependence graph generated for instructions (1)-(12) according to an example embodiment of the present invention. Instructions (1)-(12) are represented as nodes 1-12.

Figure 9:
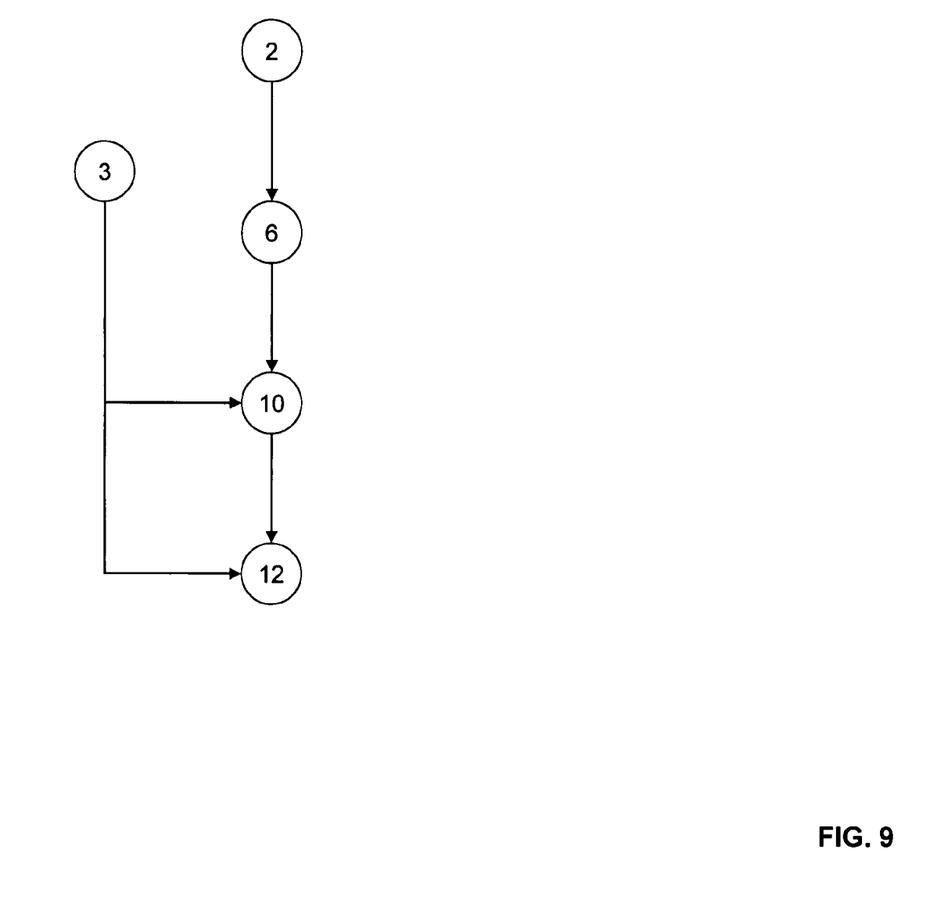
FIG. 9 illustrates an exemplary memory access dependence graph according to an example embodiment of the present invention.

At 402, a memory access dependence graph is generated. The memory access dependence graph may be generated from the instruction independence information. The memory access dependence graph shown in FIG. 9 may be generated by using the technique shown in FIG. 5.

Figure 10:
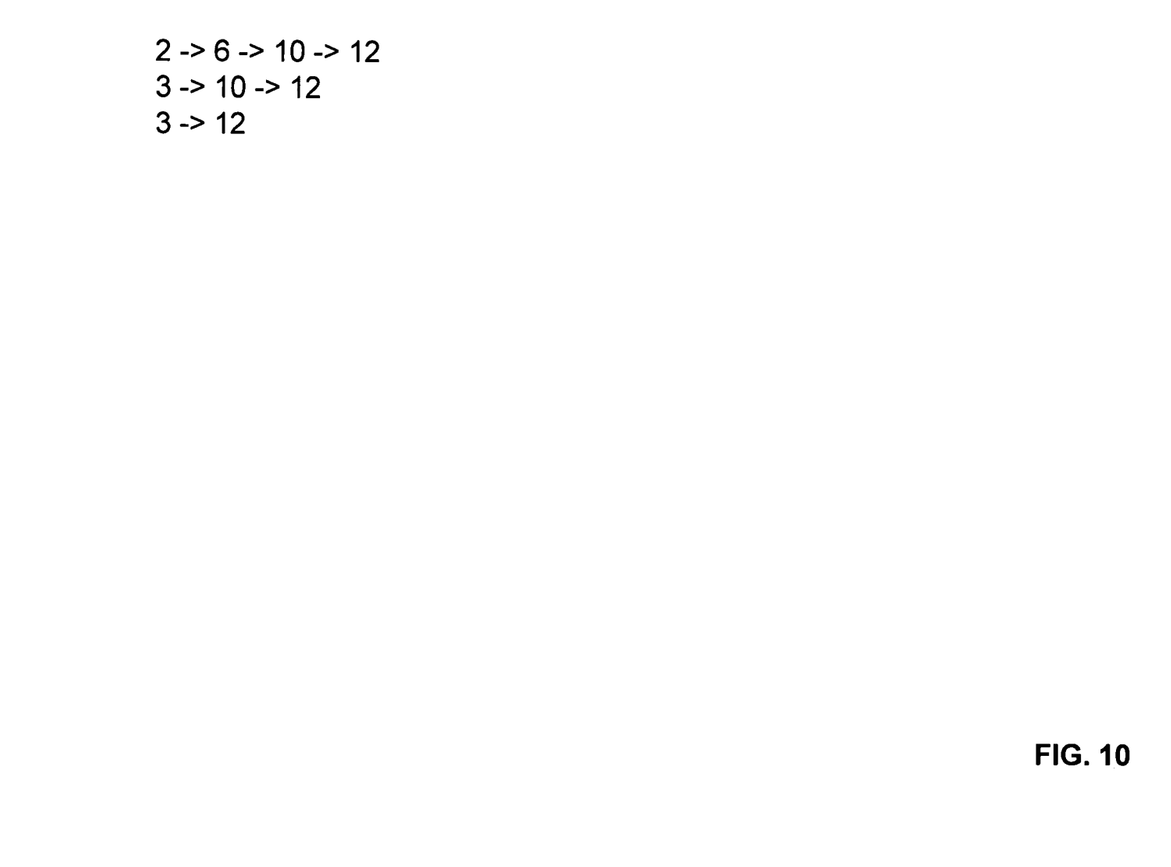
FIG. 10 illustrates exemplary memory access dependence chains according to an example embodiment of the present invention.

At 403, memory access dependence chains are generated from the memory access dependence graph. The memory access dependence chains shown in FIG. 10 may be generated by traversing the memory access dependence graph shown in FIG. 9.

At 404, the memory access dependence chains are partitioned. The set of procedures shown in FIGS. 6 and 7 may be applied to the first memory access dependence chain 2→6→10→12.

Referring to FIG. 6, at 601, the DesiredLengthofUpstream=N/d=4/2=2.

At 602, the first 2 nodes, nodes 2 and 6 that correspond to instructions (2) and (6) are assigned to the upstream stage.

At 603, instructions (2) and (6) are dependent on instructions (1) and (5), thus nodes 1 and 5 are also assigned to the upstream stage.

Assuming that the computed weight of instructions (1), (2), (5), and (6) does not exceed a predetermined value, the assignments made at 602 and 603 are utilized.

Referring to FIG. 7, at 701, the DesiredLengthofDownstream=N*(d−1)/d=4*(2−1)/2=2.

At 702, the last 2 nodes, nodes 10 and 12 that correspond to instructions (10) and (12) are assigned to the downstream stage.

At 703, since no nodes are dependent on instructions (10) and (12) which have not already been considered, no additional nodes are assigned to the downstream stage.

Referring back to FIG. 6, the second memory access chain 2→6→12 is now partitioned to the upstream stage. At 601, the DesiredLengthofUpstream=N/d=3/2=1.5, which rounds to 2. It should be appreciated that other embodiments of the invention may round differently.

At 602, the first 2 nodes, nodes 2 and 6 have already been assigned to the upstream stage. Thus, no further assignment of nodes in the memory access dependence chain or other nodes are assigned to the upstream stage. Control proceeds to FIG. 7 for partitioning to the downstream stage.

At 701, the DesiredLengthofDownstream=N*(d−1)/d=3*(2−1)/2=1.5, which rounds to 2.

At 702, the last 2 nodes, nodes 6 and 12 have already been assigned to the downstream stage. Thus, no further assignment of nodes in the memory access dependence chain or other nodes are assigned to the downstream stage.

Referring back to FIG. 6, the second memory access chain 3→10→12 is now partitioned to the upstream stage. At 601, the DesiredLengthofUpstream=N/d=3/2=1.5, which rounds to 2.

At 602, of the first 2 nodes, nodes 3 and 10, node 3, which corresponds to instruction (3) is assigned to the upstream stage. Node 10 has already been assigned to the downstream stage.

At 603, instruction (3) is dependent on instruction (1) which has already been assigned to the upstream stage.

Assuming that the computed weight of instructions (1), (2), (3), (5), and (6) does not exceed a predetermined value, the new assignments made at 602 is utilized.

Referring to FIG. 7, at 701, the DesiredLengthofDownstream=N*(d−1)/d=3*(2−1)/2=1.5, which rounds to 2.

At 702, the last 2 nodes, nodes 10 and 12 have already been assigned to the downstream stage. Thus, no further assignment of nodes in the memory access dependence chain or other nodes are assigned to the downstream stage.

Referring back to FIG. 6, the third memory access chain 3→12 is now partitioned to the upstream stage. At 601, the DesiredLengthofUpstream=N/d=2/2=1.

At 602, the first nodes, node 3, has already been assigned to the upstream stage. Thus, no further assignment of nodes in the memory access dependence chain or other nodes are assigned to the upstream stage. Control proceeds to FIG. 7 for partitioning to the downstream stage.

At 701, the DesiredLengthofDownstream=N*(d−1)/d=2*(2−1)/2=1.

At 702, the last node, nodes 12 has already been assigned to the downstream stage. Thus, no further assignment of nodes in the memory access dependence chain or other nodes are assigned to the downstream stage.

Thus, nodes (1), (2), (3), (5), and (6) are assigned to the upstream stage, and nodes (10) and (12) are assigned to the downstream stage.

Figure 11:
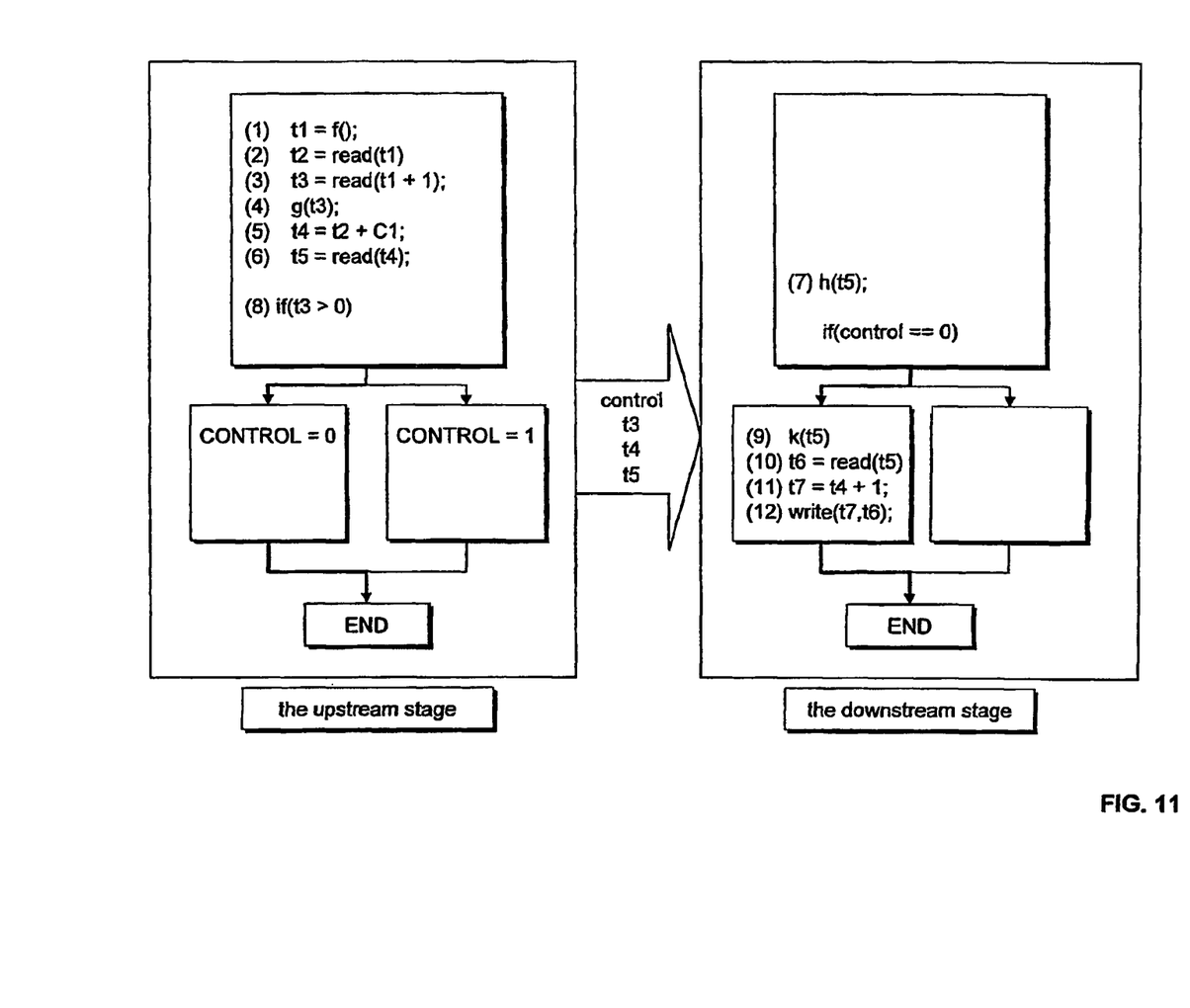
FIG. 11 illustrates an exemplary pipelined program with balanced memory latency according to an example embodiment of the present invention.

Referring back to FIG. 4, at 405, the remaining instructions are assigned. According to an embodiment of the present invention, the remaining instructions may be assigned while trying to balance a computed weight among the pipelined stages, or using other techniques. In this example, instructions (4) and (8) are assigned to the upstream stage, and instructions (7), (9), and (11) are assigned to the downstream stage to generate the exemplary pipelined program with balanced memory latency as shown in FIG. 11.

Embodiments of the present invention may be provided as a computer program product, or software, that may include a machine-readable medium having stored thereon instructions. The machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The term "machine readable medium" used herein shall include any medium that is capable of storing or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method of compiling code, comprising:
partitioning instructions in the code among a plurality of processors based on memory access latency associated with the instructions by:
  partitioning memory access dependence chains into an upstream stage by assigning a first number of desired upstream nodes to the upstream stage, and also assigning instructions in the code on which the first number of desired upstream nodes are dependent to the upstream stage, wherein the first number of desired upstream nodes is N/d where N is a length of the memory access dependence chain and d is a pipelining degree; and
  partitioning the memory access dependence chains into a downstream stage by assigning a last number of desired downstream nodes to the downstream stage, and assigning instructions in the code which are dependent on the last number of desired downstream nodes to the downstream stage, wherein the last number of desired downstream nodes is N*(d−1)/d;
performing the partitioning a plurality of times with subsequent partitioning being performed on the instructions assigned to the downstream stage.

2. The method of claim 1, wherein the length of the memory access dependence chain N is a number reflecting all available tasks in a sequence of memory read and write instructions.

3. The method of claim 1, further comprising:
if a weight required for execution of the upstream stage exceeds a predetermined value, re-computing the number of desired upstream nodes;
assigning the re-computed number of desired upstream nodes to the upstream stage; and
assigning instructions in the code on which the re-computed number of desired upstream nodes are dependent to the upstream stage.

4. The method of claim 1, wherein generating the memory access dependence chains comprises identifying instruction dependence information.

5. The method of claim 1, wherein generating the memory access dependence chains comprises constructing a memory access dependence graph.

6. The method of claim 1, wherein generating the memory access dependence chains comprises:
constructing a memory access dependence graph; and
identifying a memory access dependence chain from the memory access dependence graph.

7. An article of manufacture comprising a non-transitory machine accessible medium including sequences of instructions, the sequences of instructions including instructions which when executed cause the machine to perform:
partitioning instructions in code among a plurality of processors based on memory access latency associated with the instructions by:
  partitioning memory access dependence chains into an upstream stage by assigning a first number of desired upstream nodes to the upstream stage, and also assigning instructions in the code on which the first number of desired upstream nodes are dependent on to the upstream stage, wherein the first number of desired upstream nodes is N/d where N is a length of the memory access dependence chain and d is a pipelining degree; and
  partitioning the memory access dependence chains into a downstream stage by assigning a last number of desired downstream nodes to the downstream stage, and assigning instructions in the code which are dependent on the last number of desired downstream nodes to the downstream stage, wherein the last number of desired downstream nodes is N*(d−1)/d;
performing the partitioning a plurality of times with subsequent partitioning being performed on the instructions assigned to the downstream stage.

8. The article of manufacture of claim 7, further comprising instructions which when executed cause the machine to further perform constructing a memory access dependence graph.

9. A code analysis unit implemented on a processor, comprising:

a dependence information unit to identify dependencies between instructions in code; and a code partitioning unit to partition instructions in the code into a plurality of pipeline stages to be executed by a plurality of processors based on memory access latency associated with the instructions by partitioning memory access dependence chains into an upstream stage by assigning a first number of desired upstream nodes to the upstream stage, and also assigning instructions in the code on which the first number of desired upstream nodes are dependent to the upstream stage, wherein the first number of desired upstream nodes is N/d where N is a length of the memory access dependence chain and d is a pipelining degree; and partitioning the memory access dependence chains into a downstream stage by assigning a last number of desired downstream nodes to the downstream stage, and assigning instructions in the code which are dependent on the last number of desired downstream nodes to the downstream stage, wherein the last number of desired downstream nodes is N*(d−1)/d;

performing the partitioning a plurality of times with subsequent partitioning being performed on the instructions assigned to the downstream stage.

10. The apparatus of claim 9, wherein the code partition unit comprises:

an evaluation unit to determine whether a weight of the upstream stage exceeds a predetermined value.

11. The apparatus of claim 10, wherein the length unit determines a new number of desired length of upstream nodes in response to the evaluation unit determining that the weight of the upstream stage exceeds the predetermined value.

12. The apparatus of claim 10, wherein an evaluation unit to determine whether a weight of the downstream stage exceeds the predetermined value.

13. The apparatus of claim 12, further comprising a balancing unit to assign remaining instructions to the upstream stage and the downstream stage in a manner that substantially balances weight.

14. The apparatus of claim 10, further comprising a code partition manager that receives instruction dependence information and the memory access dependence chains.

15. The apparatus of claim 9, wherein the dependence information unit generates a memory access dependence graph and memory access dependence chains from instruction dependence information.

\* \* \* \* \*

UNITED STATES PATENT AND TRADEMARK OFFICE
CERTIFICATE OF CORRECTION

PATENT NO.      : 8,543,992 B2
APPLICATION NO. : 10/585680
DATED           : September 24, 2013
INVENTOR(S)     : Xiaodan Jiang et al.

Page 1 of 1

It is certified that error appears in the above-identified patent and that said Letters Patent is hereby corrected as shown below:

In the Claims

In column 11, line 9, in claim 9, delete "by" and insert -- by: --, therefor.

Signed and Sealed this
Fourth Day of March, 2014

Michelle K. Lee
*Deputy Director of the United States Patent and Trademark Office*